United States Patent [19]

Seelig

[11] Patent Number: 4,646,313
[45] Date of Patent: Feb. 24, 1987

[54] INERT GAS ION LASER

[75] Inventor: Wolfgang Seelig, Darmstadt, Fed. Rep. of Germany

[73] Assignee: Siemens Aktiengesellschaft, Berlin & Munich, Fed. Rep. of Germany

[21] Appl. No.: 780,695

[22] Filed: Sep. 26, 1985

[30] Foreign Application Priority Data

Sep. 26, 1984 [DE] Fed. Rep. of Germany ....... 3435311

[51] Int. Cl.$^4$ ............................................. H01S 3/03
[52] U.S. Cl. ...................................... 372/64; 372/55; 372/28; 372/26
[58] Field of Search ..................... 372/55, 64, 61, 26, 372/28

[56] References Cited

U.S. PATENT DOCUMENTS

| 3,646,476 | 2/1972 | Barker et al. | |
|---|---|---|---|
| 3,889,207 | 6/1975 | Burgwald et al. | |
| 3,961,283 | 6/1976 | Abrams et al. | 372/64 |
| 4,380,077 | 4/1983 | McMahan | 372/61 |
| 4,477,907 | 10/1984 | McMahan | 372/64 |

OTHER PUBLICATIONS

Papayoanou et al, "Porous-Wall BeO Capillary Waveguide Laser", Appl. Phys. Lett., vol. 26, No. 4, 15 Feb. 1975.

"Properties and Current-Voltage Characteristics of Discharges in Waveguides Gas Lasers", Schuocker et al., Applied Physics, (1977).

Primary Examiner—Léon Scott, Jr.
Attorney, Agent, or Firm—Hill, Van Santen, Steadman & Simpson

[57] ABSTRACT

A miniaturized inert gas ion laser is proposed whose discharge column has a diameter between $6 \times 10^{-3}$ cm and $8 \times 10^{-2}$ cm. In a preferred embodiment, a BeO plate is enclosed by two metal parts which lie against one of the base areas of the plate. One metal part is a copper sheet functioning as anode and the other metal part forms a cavity in which the cathode is situated. The BeO plate is provided with a longitudinal bore which is terminated at both sides by mirrors and communicates via plate perforations with the anode and the cathode space. The bore is 0.1 mm in size and 30 mm long; the discharge occurs on a path of 10 mm; discharge current, discharge voltage and filling pressure lie at 200 mA, 130 V and 5 Torr; the output power amounts to about 1 mW. This type of laser is extremely compact; it is particularly suitable as a stable frequency signal generator and can be simply amplitude-modulated and/or frequency-modulated.

19 Claims, 9 Drawing Figures

INERT GAS ION LASER

BACKGROUND OF THE INVENTION

1. Field of the Invention

The invention relates to an inert gas ion laser comprising a member having an elongated, gas-filled cylindrical discharge channel, two electrodes with which a gas discharge can be generated in the discharge channel and two spaced mirrors forming an optical resonator which enclose the discharge channel between them.

2. Description of the Prior Art

For years, the need for coherent light sources which should emit a continuous beam in the visible spectrum with a power between 0.5 mW and 5 mW has been covered by helium-neon lasers.

In the meantime, this type of laser has been developed into a technologically mature component with long-term stability which can also be inegrated without further ado into the most modern optical systems, for example video disc players. There unsatisfactory, however, is the fact that HeNe lasers continue to require a great deal of space. Thus, the currently smallest tube, the 0.5 mW laser offered by the Spectra-Physics Company under the designation "007", still has a length of 11.5 cm and a diameter of about 2.5 cm and further advances in this area are hardly possible for physical reasons.

Alternatives had therefore already been sought. The argo laser thereby had to appear particularly attractive: it offers amplification values per length unit that are an order of magnitude higher than in HeNe lasers. Over and above this, calculations on the basis of balance equations with which the laser intensification mechanisms and the gas discharge events can be approximately described has led to similarity laws which at least did not exclude a start-up even given very narrow, short discharge tubes (periodical Physik 215 (1968) 437 and 219 (1969) 5). Insofar as known, these scaling rules were not, however, verified for tube diameters <1 mm; efforts, instead, were exclusively concentrated on larger discharge volumes for generating medium through high output powers. Mini argon lasers may possibly not have been taken into consideration because technological problems were envisioned (cf., in this regard, U.S. Pat. No. 3,646,476, initially cited patent, particularly Col. 3, paragraph 2) or excessively high magnetic fields were considered necessary (cf., in this regard, Appl. Phys. 4 (1974) 141, particularly Eq. (7)).

Semiconductor lasers which are extremely compact and are already used where a light wavelength >0.7 μm is acceptable and excessively high demands are not made of the reliability may possibly present serious competition. It is therefore presently entirely unresolved as to whether and, under given conditions, when laser diodes are in a position to penetrate into high-frequency areas as well.

SUMMARY OF THE INVENTION

It is therefore an object of the invention to specify a laser which can generate light with wavelengths <0.7 μm, requires a low structural volume and promises a long useful life. This object is inventively achieved by a gas laser.

The invention proceeds on the basis of the finding that, given suitably selected operating parameters, a steady-state laser activity arises even given smallest capillary diameters and extremely short discharge lengths. Thus, for example, an argon laser can be realized which supplies a 1 mW strong 0.488 μm line with a discharge path of 1 cm, a mirror distance of 3 cm, a discharge cross-section of 0.1 mm and a power consumption of 25 W. The construction is thereby not excessively loaded and manages, surprisingly, without magnetic field.

The range of possible operating parameters is essentially determined by the following boundary conditions:

1. A low-pressure arc discharge should be marked by electron-atom impacts and which is wall-stablized should burn in the filler gas. In this case, the population inversion becomes maximum when the products of the filling pressure p and the capillary radius R as well as of the longitudinal field strength $E_Z$ prevailing in the discharge and the capillary radius have defined values which are independent of the current density, when thus $$pR = k_1 \tag{1}$$

$$E_z R = k_2 \tag{2}$$

2. The laser amplification saturates when the laser levels are emptied by electron impacts with a rate which is no longer small in comparison to the radiation decay rate. In order to avoid this saturation effect, the electron density $n_e$ dare not exceed a certain limit value (periodical Physik 264 (1973) 61, Sec. 2). This means that the discharge current density j must remain below a limit value $j_{gr}$:

$$j \leq j_{gr} \tag{3}$$

3. A saturation of the laser amplification also occurs when the migration rate of the laser ions to the tube wall reaches the order of magnitude of the radiation decay rate. This saturation effect does not occur when the capillary radius R remains above a limit value $R_{gr}$, i.e.

$$R \geq R_{gr} \tag{4}$$

applies.

4. The light suffers losses due to diffraction, respectively attenuation effects and due to reflection at the mirrors and these losses should be kept as low as possible. When the laser functions with modes ("resonant modes") at which the light propagates between the mirrors in free space, then diffraction losses dominate. They are lowest when the light oscillates in a confocal resonator configuration in the $TEM_{oo}$ mode and are still tolerable in this case when $$F = R^2/\lambda L \geq 0.5 \tag{5}$$

applies (Bell Syst. Techn. J. 40 (1961) 453, particularly FIG. 15). When a change to smaller F-values is undertaken, then a waveguide mode is preferable wherein the light is conducted by reflections at the tube wall. Particularly deriving here are transmission losses which are dependent on the laser wavelength, the tube diameter, the mode type and the refractive index of the wall material. For the basic mode $EH_{11}$ and a tube having an optical density n, the loss per length unit v derives at $$v = \frac{n^2+1}{\sqrt{n^2-1}} \cdot \frac{\lambda^2}{R^3} \text{ [\% per cm]} \tag{6}$$

according to Bell Syst. Techn. J. 43 (1964) 1783.

5. The discharge must take place in a body that is not excessively loaded by the dissipated heat.

The dissipated power, which amounts to more than 99% of the supplied power P, is to be limited such that the temperature at the inside tube wall does not exceed a critical value which lies far below the melting temperature and such that the thermally conditioned stresses do not lead to breakage; the differences in longitudinal expansion between inside and outside of the tube are especially critical. For cylindrical-symmetrical discharge tubes having the length $L_e$ and the supplied power $P = U \cdot i$ $$T_i - T_a = \Delta T = \frac{P}{2\pi L_e \Lambda} \ln \frac{R_a}{R} \text{ [}^\circ K\text{]} \tag{7}$$

is valid for the temperature at the inside tube wall ($T_i$) in the steady-state mode, wherein
  $T_a$ = temperature at the outside tube wall
  $\Lambda$ = coefficient of thermal conductivity [Ws/cm°K.]
  $R_a$ = outside tube radius [cm].

$T_a$ is kept to a defined value by means of cooling and $T_i$ should not lie more than 200° K. above this. So that the tube does not break, its length should remain below a limit length $L_{gr}$ to which $$L_{gr} = \frac{2}{\eta} \sqrt{\frac{2\sigma_B}{E}} \frac{R_a}{\Delta T} \text{ [cm]} \tag{8}$$

applies, wherein
  $\eta$ = coefficient of thermal expansion [°K.$^{-1}$]
  $\sigma_B$ = breaking stress [kp/cm$^2$]
  E = modulus of elasticity [kp/cm$^2$].

When T is eliminated from equation (7) and (8) and $L_{gr} = L_e$ is inserted, then $$P = 2\pi K \Lambda R_a / \ln \frac{R_a}{R} \text{ [W]} \tag{9}$$

results, with $$K = 2\sqrt{2\sigma_B/E}.$$

For a typical use case, the ArI laser with the 0.488 μm line and a cylindrical-symmetrical beryllium oxide tube, the enumerated dimensioning rules produce the following numerical values:

The required type of gas discharge is established when $$jR \leq 50 \text{ [A/cm]} \tag{10}$$

j = discharge current density applies. In this range, the differential gain $g_o$ and the output power $\Phi$ have maximum values when $$PR = 2.5 \times 10^{-2} \text{ [Torr cm]} \tag{11}$$

and $$E_z R = 0.65 \text{ [V]} \tag{12}$$

apply. The length-normalized power P/L can be calculated from (10) and (12):

$$P/L = iU/L = j\pi R^2 E_z \leq 100 \tag{13}$$

i = discharge current.

Valid under these preconditions are $$g_o = 10^{-8} \, i^2/R^4 \text{ [cm}^{-1}\text{]}. \tag{14}$$

$$\Phi = 4 \times 10^{-7} \, i^2 L/R^2 \text{ [W]} \tag{15}$$

$$= 6 \times 10^{-7} \, P^2/L \text{ [W]}$$

and, because of (10), $$\Phi/L \leq g \times 10^{-3} \text{ [W/cm]} \tag{16}$$

The electron impact emptying of the laser level plays no part for the discharge current densities and discharge currents up to the limit values $$j_{gr} = 2500 \text{ [A/cm}^{-2}\text{]} \tag{17}$$

$$i_{gr} \approx 7500 \, R^2 \text{ [A]} \tag{18}$$

Following from this current limitation as limit values for the values $g_o$, P and $\Phi/L$ are $$g_o \approx 0.15 \text{ [cm}^{-1}\text{]} \tag{19}$$

$$P \approx 5 \times 10^3 RL \text{ [W]} \tag{20}$$

$$\Phi/L \approx 15 R^2 \text{ [W/cm]} \tag{21}$$

When the output power is summed over all lines, then $$\Phi_\Sigma \geq 2\phi_{4880} \geq 30 R^2 L \text{ [W]}. \tag{22}$$

The migration losses of the laser ions to the tube wall are negligible when the tube radius is greater than $$R_{gr} = 5 \times 10^{-3} \text{ [cm]} \tag{231}$$

When the laser operates with a confocal mirror arrangement and a TEM$_{oo}$ mode, then Eq. (5) supplies $$R^2/L \geq 2 \times 10^{-5} \text{ [cm]} \tag{24}$$

The mirror spacing can be even greater in practice. Given very thin cross sections (R < 2 × 10$^{-2}$ cm), the mirrors can even lie apart by 2 to 3 times the L-value from the Fresnel number F. Resulting from Eq. (6) in waveguide mode is that the losses can be neglected in comparison to the gain values when $$R \geq 5 \times 10^{-3} \text{ cm} \tag{25}$$

applies.

For the tube, EQS. (7), (8) and (9) supply, with the material constants for BeO and the assumption $\Delta T = 100°$ K.

$$R_a/R \leq 90 \tag{26}$$

and $$L_e/R \leq 6300 \tag{27}$$

One can see that the physically prescribed geometry limits can be realized without further ado with beryllium oxide.

With its short structural length, the proposed miniature laser allows a single-frequency operation. It is therefore particularly suitable for generating stable-frequency signals or for emitting amplitude and/or frequency modulated light.

BRIEF DESCRIPTION OF THE DRAWINGS

The proposed solution shall now be explained in greater detail with reference to two preferred exemplary embodiments in conjunction with the attached drawing. In the FIGS., mutually corresponding parts are provided with the same reference characters. Shown therein are.

DESCRIPTION OF THE PREFERRED EMBODIMENTS

Figure 1:
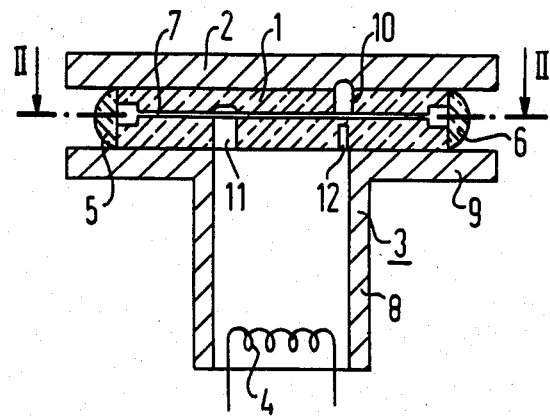
FIG. 1, an argo laser in a longitudinal section.
Figure 2:
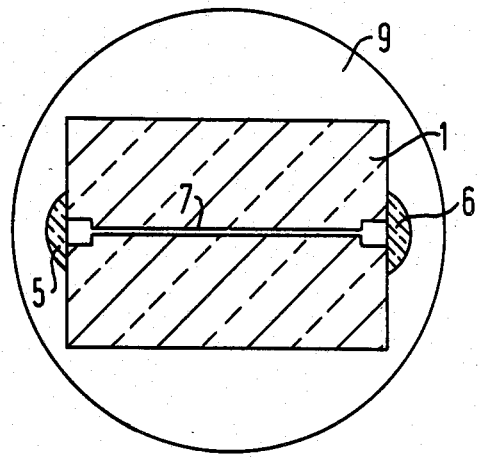
FIG. 2, the laser of FIG. 1 in the section II-II.

In detail, the gas laser of FIG. 1 contains a solid body 1, an anode 2, a cathode pot 3 with a cathode 4, as well as two resonator mirrors 5, 6.

The body 1 has the form of a plate which has an area of 30×20 mm², is 5 mm thick and is composed of beryllium oxide. This plate is provided with a 0.1 mm large center bore ("discharge channel") 7 which penetrates the plate 1 concentrically relative to its center axis parallel to the longitudinal edge. The discharge channel is somewhat expanded at its two ends and is terminated there by respectively one of the two mirrors 5, 6. Lenses having a mirrored convex outside and a coated planar inside function as mirrors in the present case.

The anode 2 is composed of a copper sheet having a diameter of 40 mm and a thickness of 4 mm. This sheet covers one of the two base surfaces of the plate 1. The other base surface of the plate is covered by the cathode pot 3. As may be derived from the FIGS., the pot has the shape of a hollow cylinder 8 open at one end which is provided with an outwardly directed flange 9 at its open end. The flange, which contacts the plate 1, has roughly the same outside dimensions as the anode 2. The cathode 4 is situated in the inside of the hollow cylinder, being a commercially available electric discharge cathode in the present case.

In addition to the bore 7, the plate 1 contains three recesses which connect the discharge channel either to the anode (recess 10) or to the cathode space (recesses 11 and 12). The recesses 10 and 11, they define the length of the discharge path, are at a distance of about 1 cm from one another, and the recess 12, it is relatively narrow and serves for pressure equalization, is situated in the region of the anode recess 10. In order to prevent discharge paths through the recess 12, this opening could be displaced even closer to the mirror 6 and could discharge into the cathode space via a connecting channel in the flange 9. It can be demonstrated that axial pressure gradients in a mini argon laser ($R<4\times10^{-2}$ cm) having m equalization lines can be prevented when $$\frac{mR_1^3}{L_1} > 10^{-3} iR \qquad (28)$$

applies ($R_1$, $L_1$ = radius and length respectively of every equalization line in cm). Given this dimensioning rule, the lines are also punch through proof at the same time.

The interior of the laser contains argon under a pressure of 5 Torr. During operation, a low pressure arc discharge is maintained on the discharge path of the bore 7 with a charge current of 200 mA and a discharge voltage of 130 V. The gain factor $g_o$ lies at about 0.15 cm$^{-1}$ and the output power $\Phi$ amounts to roughly 1 mW.

Figure 3:
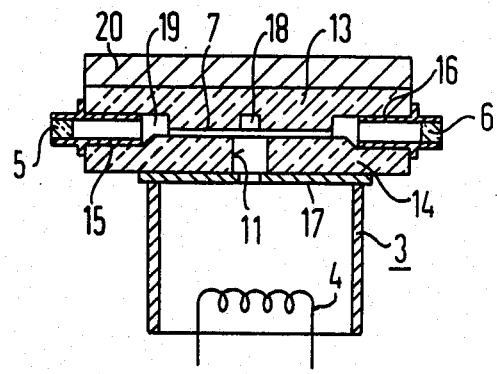
FIG. 3, a longitudinal section of another argon laser.

The exemplary embodiment of FIG. 3 is constructed as follows: the beryllium oxide plate is composed of two halves 13, 14 which have arisen by means of a cut in the center plane of the plate parallel to the base area. The FIG. shows that the discharge channel 7 is introduced into the bottom surface of the upper half 13. This channel likewise has expanded ends into which a respective mirror carrier 15, 16 is inserted. Every carrier is composed of a small metal tube with an applied stop web which accepts one of the mirrors 5, 6 and simultaneously serves as discharge anode.

The cathode pot 3 is designed as a hollow cylinder completely closed at the floor side and closed with a perforated disk 17 at the plate side. The cathode space communicates with the discharge channel via the opening of the perforated disk 17 and a central plate recess 11. In order to enable a gas return, the upper plate half 13 also contains two further channels, a cross-channel 18 and an annular groove 19. The cross-channel proceeds perpendicular to the discharge channel 7 and cuts it in the region of the central recess 11; the annular groove connects two expanded ends of the discharge channel to the ends of the cross-channel. For the purpose of a better heat elimination, the upper plate half also carries a cooling member, schematically indicated in the FIG. as block 20. For the rest, the geometrical dimensions and operating parameters are similar to those in the first exemplary embodiment.

The laser modification of FIG. 3 has specific advantages: all plate recesses can be realized in a relatively simple way; in particular, the capillaries need not be bored. All parts can be soldered vacuum-tight to one another in a traditional metal-ceramic-(glass) technique. The tube also allows high heating temperatures.

The following FIGS., for the 0.488 $\mu m$ line of the ArII, again show the optimum, respectively critical operating and dimensioning values dependent on the radius of the discharge column. Suitable parameters and the appertaining output power for a prescribed discharge cross section can be effortlessly identified with the assistance of this curve apparatus.

Figure 4:
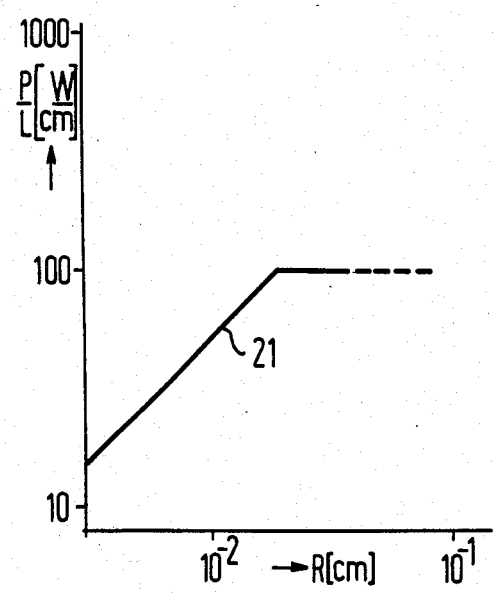
FIG. 4, the quantity P/L as a function of R.
Figure 5:
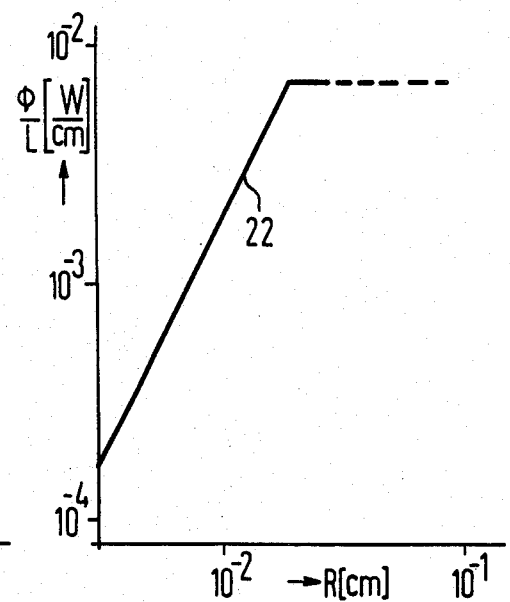
FIG. 5, the quantity $\Phi$ as a function of R.
Figure 6:
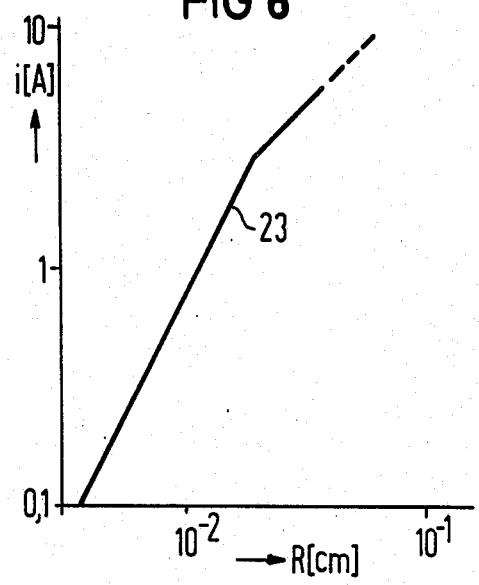
FIG. 6, the quantity i as a function of R.

FIGS. 4, 5 and 6 show the maximum values for the quantity P/L, $\Phi$/L and, respectively, i (curves 21, 22 and, respectively 22). All curves are defined for R-values $<2\times10^{-2}$ cm by the limit current density $j_{gr}$ and are defined for larger radii by the demand $jR \leq 50A/cm$.

Figure 7:
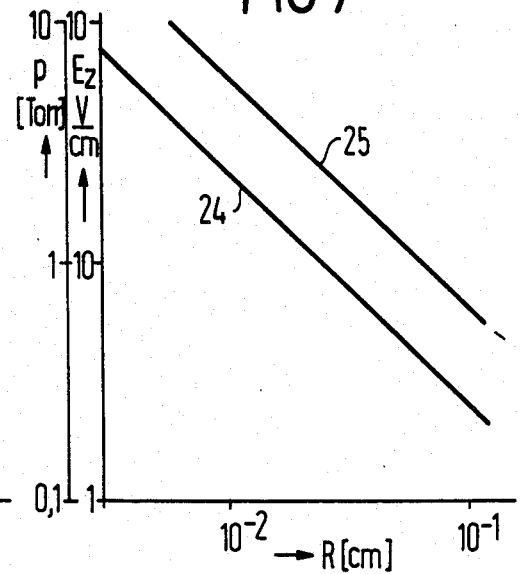
FIG. 7, the quantities p and $E_z$ dependent on R.

FIG. 7 presents Eqs. (11) and (12) in curves 24 and 25, respectively.

Figure 8:
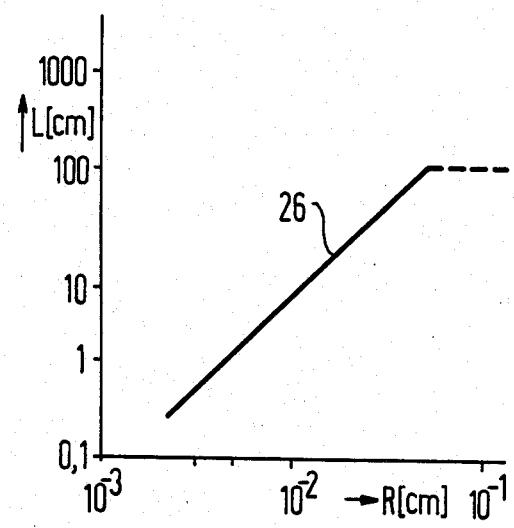
FIG. 8, the limit length of a BeO discharge tube, as a function of R.

The critical length of a BeO member is entered in FIG. 8, namely for a $TEM_{oo}$ mode in a confocal mirror arrangement (curve 26). The curve shows that the maximum member length in the inventively prescribed range of inside cross section is defined only by diffraction losses. Only given an inside. diameter of about 1 mm would the rise of the straight line 26 be cut off by the mechanically defined limit length. At this point, let it again be pointed out that a mirror spacing between 2L and 3L is possible given very small radii ($R < 2 \times 10^{-2}$ cm) for the Fresnel number F employed ($F = R^2/\lambda L$).

Figure 9:
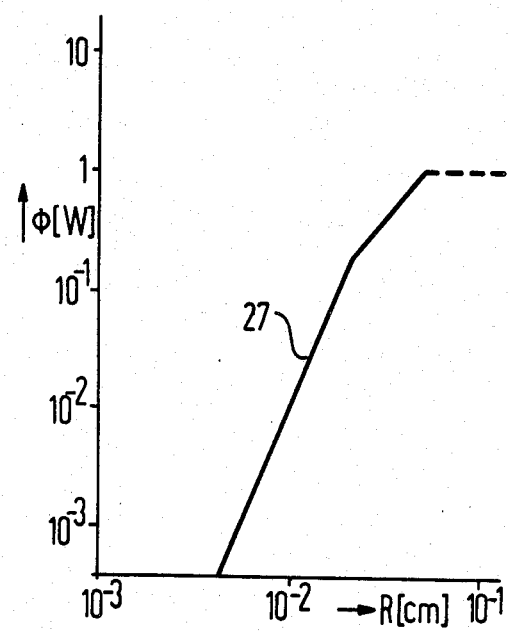
FIG. 9, $\Phi$ entered relative to R, for a $TEM_{oo}$ wave in a confocal resonator.

The output power $\Phi$ shown in FIG. 9 (curve 27) is limited in the first segment by saturation effects (Eqs. (15) and (20)) and is limited in the second segment beginning at $R = 2 \times 10^{-2}$ cm by diffraction losses (Eqs. (16) and (24)).

The invention is not limited merely to the illustrated exemplary embodiments. Thus, other laser transitions of the ionized argon or other ionized inert gases can be employed, for instance the lines of ArIII lying at 0.3638 μm or 0.3511 μm, or the 0.3507 μm line of KrII. Insofar as the conditions must thereby be redetermined, this is at least possible without extraordinary outlay for the most important laser transitions. Independently thereof, the laser could also be operated in pulsed mode instead of continuous wave mode and, in individual cases, could also be employed as amplifier. Further left to the discretion of a person skilled in the art is to also structurally modify the laser. For example, the discharge channel can be lent an angular cross section and/or be operated in a mixed mode in which the discharge tube functions as a wave guide and maintains a defined distance from the mirrors; also conceivable is the employment of different channel plate materials such as aluminum oxide, boron nitride, eloxiated aluminum or certain crystals.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. An inert gas ion laser comprising:
    a plate member having an elongated, gas-filled cylindrical discharge channel terminated at both sides by spaced mirrors disposed at opposite end faces of said plate
    a discharge anode and cathode generating discharge in said discharge channel, and said plate member being enclosed between two metal parts, one of said metal parts being a plate and serving as said discharge anode and the other of said metal parts forming a cavity in which said discharge cathode is disposed said, discharge channel being connected to said anode through a recess in said plate member and is connected to said cavity in which said cathode is disposed via two further recesses in said plate member, one of said plate recesses at the cathode side is situated in the region of said first plate recess,
    said discharge channel having a maximum cross-dimension in the range of $6 \times 10^{-3}$ cm to $8 \times 10^{-2}$ cm.

2. A laser according to claim 1, wherein said discharge channel has a cross-dimension in the range of $10^{-2}$ cm to $6 \times 10^{-2}$ cm.

3. A gas laser according to claim 1, wherein the filling gas is argon.

4. Laser according to claim 1, wherein the filling pressure of the gas is in the range of $2 \times 10^{-2}/R$ to $3 \times 10^{-2}/R$ Tr/cm wherein R is the radius of the discharge channel.

5. A laser accordin9 to claim 1, wherein said member is composed of beryllium oxide and in that the length of said member is less than or equal to 6300 times the cross-dimension of the discharge chamber and the ratio of the smallest outside cross-dimension of said member to cross-dimension of said discharge chamber is less than or equal to 4.5.

6. A laser according to claim 1, wherein the spacing between said mirrors is 2 to 3 times greater than the length of the gas discharge path in said discharge channel.

7. A laser according to claim 1, including at least one pressure equalization line wherein $$\frac{m r_1^3}{L_1} > 10^3 \, iR$$

where m represents the number of pressure equalization lines, $r_1$ represents the largest cross-dimension, $L_1$ represents length and i represents discharge current density, and R represents the radius of the discharge channel.

8. A laser according to claim 1, wherein said mirrors are lenses comprising a mirrored, curved outside and a coated, planar inside.

9. A laser according to claim 1, wherein:
    said member is designed as a bipartite plate which is cut in a plane parallel to one of its base areas,
    said discharge channel is introduced into the first plate part, namely in the surface therecf contacting the other plate part,
    said discharge channel is expanded at both of its ends and each of these expansions accepts a mirror carrier,
    every mirror carrier is composed of a small metal tube which holds one of said mirrors and serves as a discharge anode,
    said plate has a metal part lying against one of its two base areas, said metal part forming a cavity which accepts the discharge cathode,
    said first plate part contains a recess which connects said expanded discharge channel ends to the center of said discharge channel,
    said second plate part contains a recess which connects the center of said discharge channel to said cathode.

10. A laser according to claim 10, wherein said recess in said first plate part is formed of an elongated cross-channel and of annular groove, whereby said cross-channel intersects said discharge channel in the center thereof and said annular groove connects said discharge channel ends to the ends of said cross-channel.

11. An argon laser according to claim 1, wherein said discharge channel has a diameter of about 0.1 mm and is approximately 3 cm long; the discharge path has a length of about 1 cm; said plate (1) is about 0.5 cm thick; discharge current and discharge voltage have values cf about 200 mA and 130 V, respectively; and in that the filling pressure amounts to about 5 Torr.

12. A method for the operation of an inert gas ion laser which includes a member having an elongated, gas-filled cylindrical discharge channel, two electrodes with which a gas discharge can be generated in the discharge channel, and two mirrors forming an optical resonator which enclose the discharge channel between them, the discharge channel having a cross-dimension, dimension the range of $6 \times 10^{-3}$ cm to $8 \times 10^{-2}$ cm comprising the steps of selecting the current density in the gas discharge to be less than 2500 A/cm$^2$ and wherein the product of the current density times the cross-dimension of the discharge channel is less than or equal to 50 A/cm.

13. A method for the operation of an inert gas ion laser which includes a member having an elongated, gas-filled cylindrical discharge channel, two electrodes with which a gas discharge can be generated in the discharge channel, and two mirrors forming an optical resonator which enclose the discharge channel between them, the discharge channel having a cross-dimension in the range of $6 \times 10^{-3}$ cm to $8 \times 10^{-2}$ cm comprising the steps of selecting the longitudinal field strength in the gas discharge within the range of 0.6 divided by the cross-dimension of the discharge channel to 0.7 divided by the cross-dimension of the discharge channel.

14. The method of operation defined in claim 13 further including the step of selecting a power range of between 0.5 m/W and 2 m/W.

15. A method of operation of an inert gas ion laser according to claim 13 further including the step of using said laser as a single frequency signal generator.

16. A method of operation of an inert gas ion laser according to claim 13 further including the step of using said laser as an amplitude-modulated light source.

17. A method of operation of an inert gas ion laser according to claim 13 further including the step of using said laser as a frequency-modulated light source.

18. A method for the operation of an inert gas ion laser which includes a member having an elongated, gas-filled cylindrical discharge channel, two electrodes with which a gas discharge can be generated in the discharge channel, and two mirrors forming an optical resonator which enclose the discharge channel between them, the discharge channel having a cross-dimension dimension in the range of $6 \times 10^{-3}$ cm to $8 \times 10^{-2}$ cm comprising the steps of operating the laser such that the laser light enclosed between the mirrors is present in a resonator mode; and selecting the mirror spacing (L) and the laser wave length ($\lambda$) and the cross-dimension of the discharge channel (R) within the ranges wherein $R^2/\lambda L \leq = 0.15$.

19. A method for the operation of an inert gas ion laser which includes a member having an elongated, gas-filled cylindrical discharge channel, two electrodes with which a gas discharge can be generated in the discharge channel, and two mirrors forming an optical resonator which enclose the discharge channel between them, the discharge channel having a cross-dimension in the range of $6 \times 10^{-3}$ cm to $8 \times 10^{-2}$ cm comprising the steps of operating the laser such that the laser light enclosed between the mirrors is present in a wave guide mode; and selecting the laser wavelength ($\lambda$) and maximum cross-dimension of the discharge channel (R) in the range wherein $2/R^3 \geq = 2 \times 10^{-2}$ cm$^{-1}$.

* * * * *